US007573219B2

(12) United States Patent
Kees et al.

(10) Patent No.: US 7,573,219 B2
(45) Date of Patent: Aug. 11, 2009

(54) DRIVE BELT SLIP DETECTION

(76) Inventors: Don Kees, 23 Walsingham Way, Billericay, Essex CM12 0YE (GB); Themi Petridis, 8 Bower Vale, Epping, Essex CM16 7AS (GB)

( * ) Notice: Subject to any disclaimer, the term of this patent is extended or adjusted under 35 U.S.C. 154(b) by 200 days.

(21) Appl. No.: 11/675,857

(22) Filed: Feb. 16, 2007

(65) Prior Publication Data

US 2007/0200522 A1 Aug. 30, 2007

(51) Int. Cl.
*H02P 7/00* (2006.01)

(52) U.S. Cl. ........................ 318/432; 318/433; 318/434

(58) Field of Classification Search ................. 318/432, 318/433, 434, 72, 139, 400.22; 322/28; 73/118.1
See application file for complete search history.

(56) References Cited

U.S. PATENT DOCUMENTS 5,144,220 A * 9/1992 Iwatani et al. ................. 322/28
6,029,512 A 2/2000 Suganuma et al.
6,675,642 B1 1/2004 Hiller et al.
2004/0206325 A1 10/2004 Momcilovich et al.

FOREIGN PATENT DOCUMENTS

GB 719698 12/1954
JP 2003-311076 5/2003

* cited by examiner

*Primary Examiner*—Karen Masih
(74) *Attorney, Agent, or Firm*—Julia Voutyras; Allan J. Lippa

(57) ABSTRACT

A method and apparatus is disclosed for detecting whether belt slip is occurring between an electric machine and a machine drivingly connected together by a drive belt using only measurements of rotor speed, voltage and current derived from the electric machine, thereby improving the sensitivity of slip detection and eliminating the need for a comparison of rotor speed with a measurement of the rotational speed of the machine.

17 Claims, 5 Drawing Sheets

DRIVE BELT SLIP DETECTION

This invention relates to detection of slippage between an electric machine and a machine to which it is drivingly connected by a drive belt, and in particular to slippage between an electric machine drivingly connected by a drive belt to an internal combustion engine.

BACKGROUND AND SUMMARY OF THE INVENTION

In order to save fuel it is known to stop the internal combustion engine of a motor vehicle when it is not needed and to restart the engine upon driver demand. An engine operated in such a manner is often referred to as being fitted with automatic stop/start control and such vehicles are sometimes referred to as micro-hybrids.

Stop/start control automatically stops and starts the engine when one or more predetermined vehicle operating conditions are met. For example, if the motor vehicle is sensed to be stationary and an accelerator pedal used to provide a driver input is not depressed for a pre-determined period of time, then this may constitute a vehicle operating condition indicating that the engine can be temporarily stopped. If the accelerator pedal is then subsequently depressed, this can be used as a vehicle operating condition to indicate that the engine must be restarted. It will be appreciated that numerous vehicle operating conditions can be used to indicate that the engine can be temporarily stopped or restarted and the above is merely one example.

A technology that can be used to restart the engine is known as a belt driven integrated starter generator (BISG) and is described in detail in US Patent publication 2004/0206325. The integrated starter/generator is used to motor the crankshaft of the engine to start the engine in lieu of a starter motor when the engine needs to be restarted and this leads to considerable loads in the belt drive used to connect the integrated starter/generator (ISG) to the crankshaft of the engine. To prevent excessive belt wear, audible squeal, and loss of torque transmission, it is important to have a mechanism that detects the onset of belt slip. The motoring torque of the BISG machine during an engine cranking event can then be reduced to protect the belt from damage, prolong the service life of the belt, prevent audible squeal, and loss of torque transmission.

It is known to determine if belt slip is occurring by comparing a measured engine speed with a measured motor speed and if there is a difference using this as an indication that belt slip is occurring. The crankshaft speed of the engine is normally measured using a speed sensor which provides a data stream with a high repetition frequency over a data bus to the ISG machine. The ISG machine either has an internal sensor that directly measures the rotor or shaft speed of the ISG or the shaft speed is inferred with high precision by the control system that activates the phase windings of the 3-phase motor.

It is a disadvantage of this technique that the resulting data stream (kbits/second) from the engine speed sensor is so large that an expensive data bus system such as a CAN bus is needed to transport the signal to the ISG machine.

It is a further disadvantage that a missing tooth speed sensor of the type normally used to provide a speed feedback to an engine management control unit is unable to provide a sufficiently high accuracy speed signal for robust belt slip detection and cannot provide a usable signal below a predetermined engine speed such as 150 RPM. Although it is possible to increase the accuracy of the data produced from such a sensor by increasing the number of teeth this will require, additional processing power produces an even larger data stream and is still unable to produce a signal at very low engine speeds.

Accordingly, this invention is directed to providing an improved method for detecting belt slip that can be applied in a cost effective manner, wherein a method for detecting slippage between an electric machine and a machine drivingly connected to the electric machine by a drive belt, comprises: determining at least two operational parameters selected from a rotational speed of a rotor of the electric machine, a current supplied to or generated by the electric machine and a voltage supplied to or generated by the electric machine; and determining whether belt slip is occurring based only upon said determined at least two operational parameters.

The rotational speed of the rotor of the electric machine, the current supplied to or generated by the electric machine, and the voltage supplied to or generated by the electric machine are all determined, and whether belt slip is occurring may be determined based upon at least two or all three operational parameters.

The electric machine may be an electric motor, and determining the rotational speed of the rotor of the electric machine, the current supplied to or generated by the electric machine, and the voltage supplied to or generated by the electric machine may comprise determining the rotational speed of a rotor of the motor, the current supplied to the motor, and the voltage supplied to the motor.

Determining the rotor speed, the current supplied to the motor, and the voltage supplied to the motor may comprise measuring the rotor speed, the current supplied to the motor, and the voltage supplied to the motor.

The method may further comprise reducing at least one of the current and the voltage supplied to the motor in order to reduce the torque produced by the motor when belt slip is determined to be occurring.

Belt slip may be determined to be occurring when the belt slip value is greater than a predetermined threshold.

The electric machine may alternatively be an electric generator.

The electric machine may be an electric generator and determining the rotational speed of the rotor of the electric machine, the current supplied to or generated by the electric machine, and the voltage supplied to or generated by the electric machine may comprise determining the rotational speed of a rotor of the generator, the current generated by the generator, and the voltage generated by the generator.

Determining the rotational speed of the rotor of the generator, the current generated by the generator, and the voltage generated by the generator may comprise measuring the rotational speed of the rotor, the current generated by the generator, and the voltage generated by the generator.

The method may further comprise, when belt slip is determined to be occurring, reducing at least one of the current and the voltage generated by the generator in order to reduce the torque required to rotate the rotor of the generator.

The machine to which the electric machine is drivingly connected may be an internal combustion engine.

It will be appreciated that features of the invention are susceptible to being combined in any combination without departing from the scope of the invention as defined by the accompanying claims.

BRIEF DESCRIPTION OF DRAWINGS

In the following text, the invention will be described in detail with reference to the attached drawings. These schematic drawings are used for illustration only and do not in any way limit the scope of the invention. In the drawings.

DETAILED DESCRIPTION OF PREFERRED EMBODIMENT(S)

Figure 1:
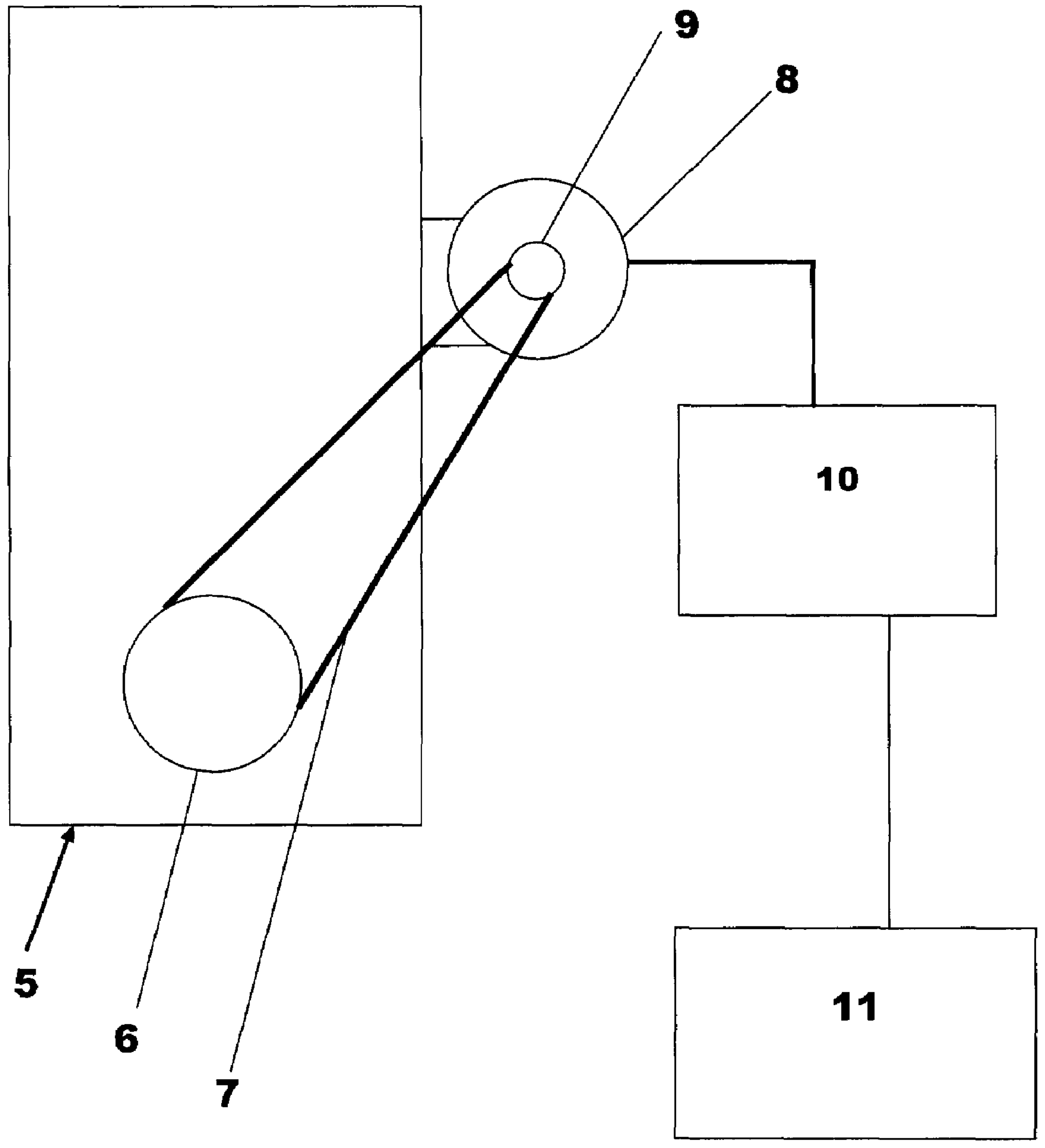
FIG. 1 is a schematic diagram of an engine for a motor vehicle having a control system according to an embodiment of the present invention.

With particular reference to FIG. 1, there is shown an internal combustion engine 5 for a motor vehicle having a crankshaft pulley 6 driven by a crankshaft (not shown) of the engine 5. The crankshaft pulley 6 is driveably connected to pulley 9 by a drive belt 7. The pulley 9 is connected to a shaft or rotor (not shown) of an electric machine in the form of combined motor/generator which in this case is an integrated starter generator (ISG) 8.

It will, however, be appreciated that the electric machine could be an electric motor or an electric generator and the invention is not limited to use with an ISG.

The ISG 8 is controlled by a controller 10 which in this case is an inverter to convert DC current from a battery 11 to a three phase alternating supply to drive the ISG 8 when it is operating as a motor and to convert three phase power from the ISG 8 to a DC output to recharge the battery when the ISG 8 is operating as a generator. It will be appreciated that other forms of controller could be used and that the invention is not limited to use with a three phase electric machine.

The rotor speed of the ISG 8 is determined in this case by an internal sensor that directly measures the rotor speed of the ISG 8 and sends a signal indicative of that measurement to the controller 10. Alternatively, the rotor speed can be inferred with high precision by the controller 10 based upon data used to activate the phase windings of the ISG 8. It will be appreciated that the controller 10 must have knowledge of the rotational position of the rotor of the ISG 8 since the activation of the phase windings must be synchronized with the rotor position to achieve efficient energy conversion and so this rotational data can be used to estimate rotor speed.

The controller 10 also measures the input voltage to the ISG 8 and the current in each phase winding. These measurements are needed to protect the switching elements of the controller 10 from damage if the supply voltage is too high. An example of an inverter for a motor vehicle is described in US patent publication 2005/0259370. The rotor speed, current and voltage are often referred to as 'operational parameters' of the electric machine 8.

The controller 10 in this case is programmed to not only control normal operation of the ISG 8 but also to perform one of two methods described in detail hereinafter to detect slippage of the drive belt 7 using only the values of rotor speed, voltage, and current derived directly from the ISG 8. It will be appreciated that the controller could alternatively be a separate component to the control means used to control normal operation of the ISG 8 and could be a stand alone component or be incorporated as part of another device such as an engine management controller or transmission controller. However, it is preferable if the controller 10 performs not only slip detection and control but also normal operational control of the ISG 8.

When belt slip is determined to be occurring, the controller 10 is operable to temporarily reduce the torque generated by the ISG 8 when the ISG 8 is operating as a motor by reducing the current supplied and to temporarily reduce the torque required to drive the rotor of the ISG 8 when the ISG 8 is operating as a generator.

Figure 5:
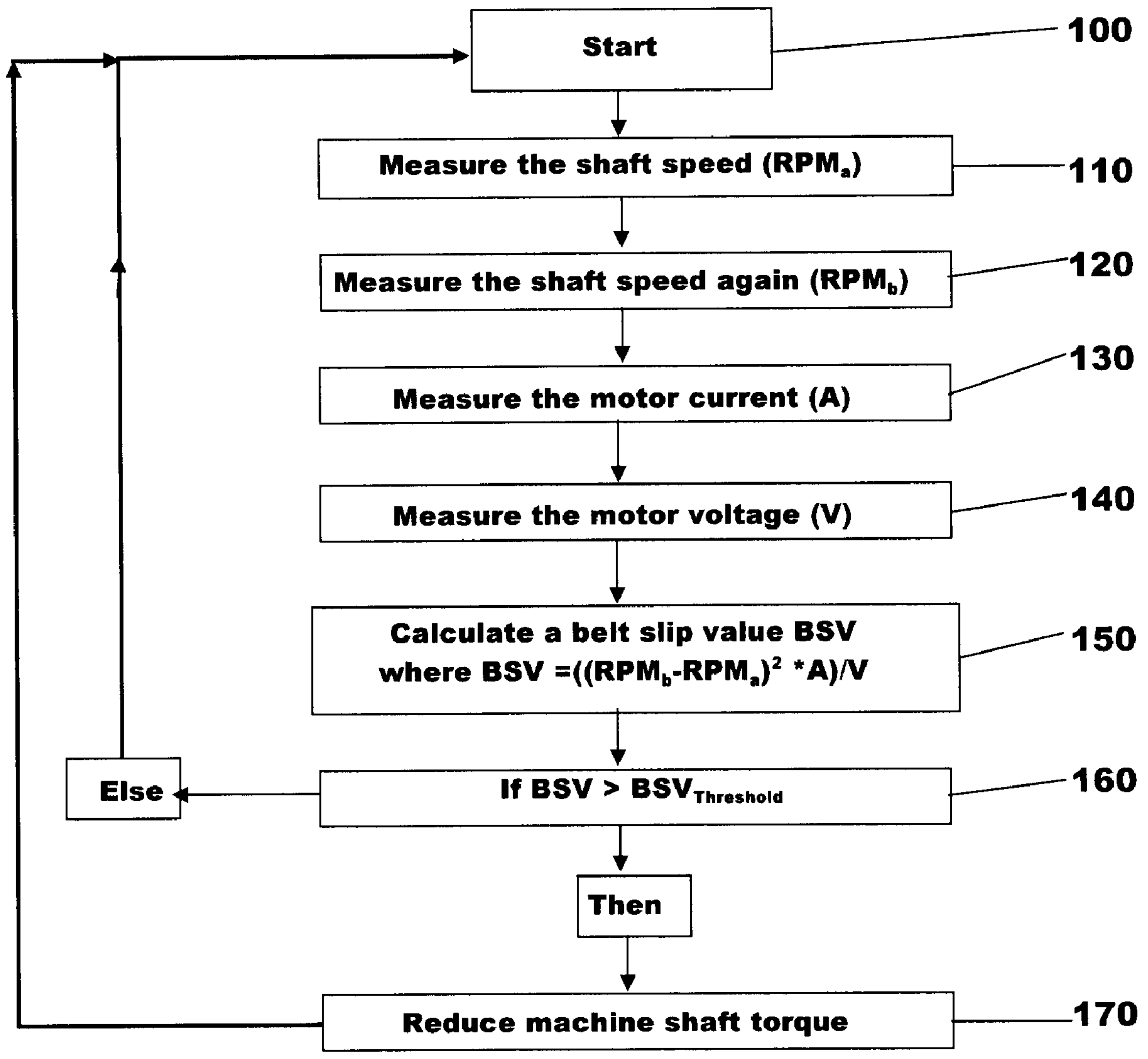
FIG. 5 is a flow chart of a first exemplary method for determining belt slip in accordance with an embodiment of the present invention.

With reference to FIG. 5, there is shown the first method for determining belt slip when the ISG 8 is operating as an electric motor.

The method starts at step 100 and proceeds to step 110 where a first measurement of rotor or shaft speed ($RPM_a$) is supplied to the controller 10. The rotor speed is measured again after a short time delay to provide a second measurement of rotor speed ($RPM_b$) as indicated by step 120 and this measurement is also supplied to the controller 10.

The period of delay will depend upon the processing power of the controller 10, but the entire method or computational loop is normally completed between 10 and 1000 times per second.

At the same time as the first measurement of rotor speed is made, the controller 10 measures the current (A) being supplied to the phases of the ISG 8 as indicated at step 130.

At the same time as the first measurement of rotor speed is made, the controller 10 measures the voltage (V) being supplied to the phases of the ISG 8 as indicated at step 140.

The controller 10 then performs a calculation to determine a belt slip value (BSV) as indicated at step 150.

In this case, the formula used to calculate BSV is:

$$BSV=((RPM_b-RPM_a)^2*A)/V$$

where:

$RPM_a$ is the first measurement of rotor speed;

$RPM_b$ is the second measurement of rotor speed;

A is the measured current; and

V is the measured voltage.

The next step in the method, as indicated at step 160, is to compare the calculated BSV with a predetermined BSV threshold ($BSV_{Threshold}$) which is set based upon experimental data.

The BSV threshold ($BSV_{Threshold}$) is set such that if the belt slip value (BSV) exceeds it, then belt slip will definitely be occurring.

If the ISG 8 is operating as a motor and at step 160 it is determined that $BSV>BSV_{Threshold}$, then belt slip is occurring and the rotor or shaft torque of the ISG 8 must be reduced. This is achieved by the controller 10 reducing the current supplied to the ISG 8 as indicated at step 170. The method is then repeated as indicated by the return line from step 170 to step 100.

If, alternatively, at step 160 it is determined that $BSV<BSV_{Threshold}$, belt slip is not occurring and the rotor or shaft torque of the ISG 8 does not need to be reduced and so the method returns directly to the start condition as indicated by the return line from step 160 to step 100.

It will be appreciated that the method could be adapted for use in the case where the ISG 8 is operating as a generator, but in this case the load on the ISG 8 is reduced so that less torque is required to rotate the rotor.

It will be appreciated that if belt slip occurs when the ISG 8 is operating as a motor, then the rotor or shaft speed of the ISG 8 will increase rapidly, whereas, if the ISG 8 is operating as a generator, the rotational speed of the rotor or shaft will fall rapidly. But, because the speed difference ($RPM_b-RPM_a$) is squared, no difference in the calculation is required to accommodate operation as a generator.

Figure 2:
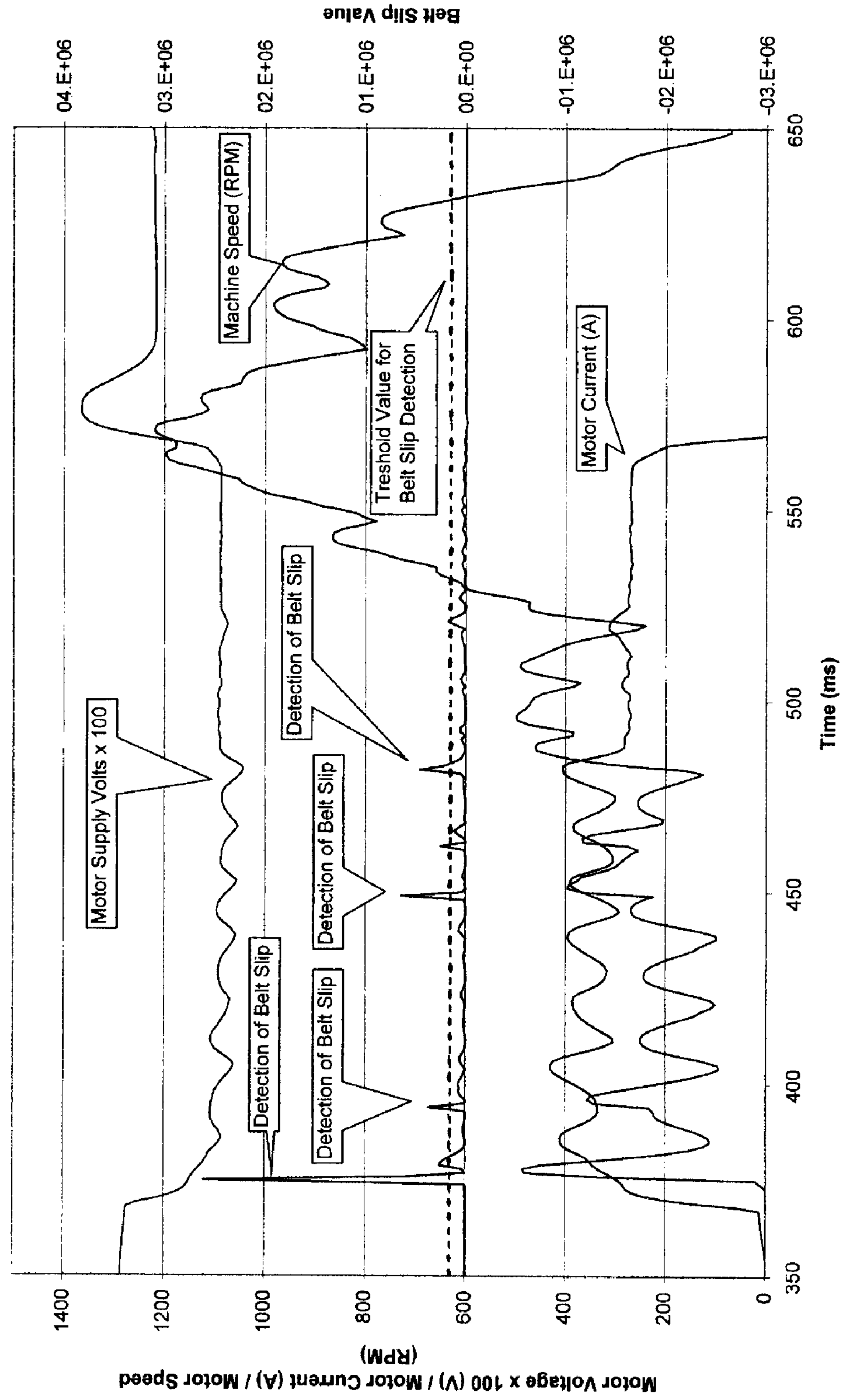
FIG. 2 is a graph showing test data with a plot of a belt slip value calculated in accordance with an embodiment of the present invention.

With reference to FIG. 2, it can be seen that when belt slip occurs at approximately 375, 380, 390, 450, 460 and 475 RPM, there is a spike in the belt slip value which takes it above the threshold value for belt slip detection and it is these spikes which indicate the presence of slippage.

Referring now to FIGS. 3A, 3B, 4A, 4B and 6, there is shown a second method for determining when belt slip is occurring when the ISG 8 is operating as a motor.

Figure 6:
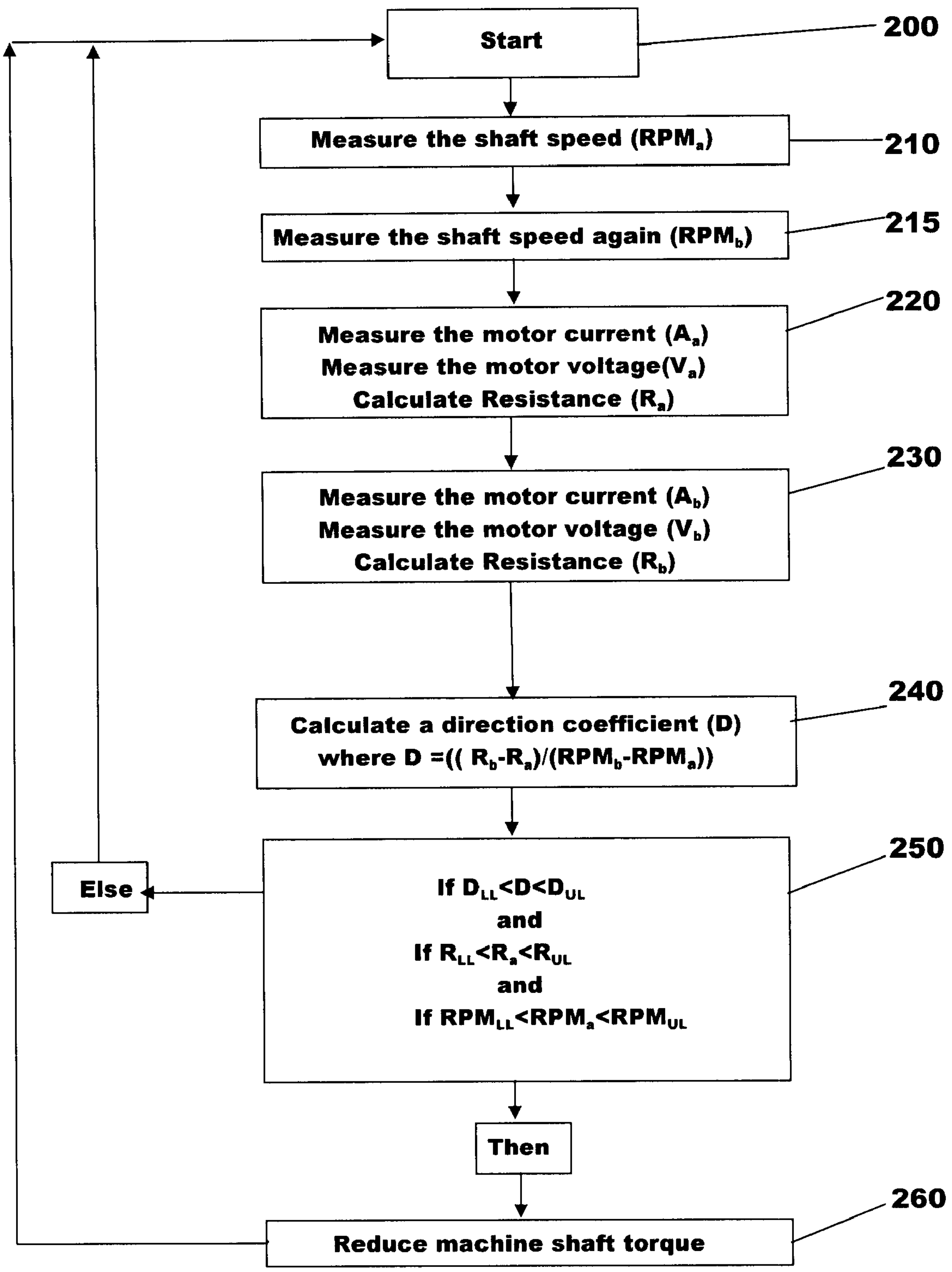
FIG. 6 is a flow chart of a second exemplary method for determining belt slip in accordance with an embodiment of the present invention.

With reference to FIG. 6, the method starts at step 200 and proceeds to step 210 where a first measurement of rotor or shaft speed ($RPM_a$) is supplied to the controller 10. The rotor speed is measured again after a short time delay to provide a second measurement of rotor speed ($RPM_b$) as indicated by step 215 and this measurement is also supplied is to the controller 10.

At the same time as the first measurement of rotor speed is made, the controller 10 measures the current ($A_a$) and voltage ($V_a$) being supplied to the phases of the ISG 8 and divides the voltage ($V_a$) by the current ($A_a$) to calculate a first internal resistance ($R_a$) as indicated at step 220.

At the same time as the second measurement of rotor speed is made, the controller 10 measures the current ($A_b$) voltage ($V_b$) being supplied to the phases of the ISG 8 and divides the voltage ($V_b$) by the current ($A_b$) to produce a second internal resistance value ($R_b$) as indicated at step 230.

The next step, indicated as step 240, is to use the first and second internal resistance values ($R_a$) and ($R_b$) and the first and second rotor speed values ($RPM_a$) and ($RPM_b$) to calculate a direction coefficient (D) using the equation:

$$D=((R_b-R_a)/(RPM_b-RPM_a))$$

The next step, indicated as step 250, is to check whether one or more of the measured or calculated values are within predetermined limits to establish whether slip is occurring.

In the method shown, three separate limit tests are made, and only if all three tests are passed is slip determined to be occurring.

The first limit test is to determine whether the first resistance value ($R_a$) is within predetermined limits which in this case are 10 and 20 mOhms using the test:

$$\text{Is } R_{LL}<R_a<R_{UL}$$

where:

$R_{LL}$ is the lower predetermined resistance limit; and $R_{UL}$ is the upper predetermined resistance limit.

If the first resistance value is between these lower and upper limits $R_{LL}$ and $R_{UL}$, then the test is passed. The second limit test is to determine whether the first rotor speed value ($RPM_a$) is within predetermined speed limits which in this case are 100 and 1000 RPM using the test:

$$\text{Is } RPM_{LL}<RPM_a<RPM_{UL}$$

where:

$RPM_{LL}$ is a lower predetermined speed limit; and $RPM_{UL}$ is an upper predetermined speed limit.

If the first rotor speed value ($RPM_a$) is between these lower and upper limits $RPM_{LL}$ and $RPM_{UL}$, then the test is passed.

The third limit test is to determine whether the direction coefficient (D) is between lower and upper limits which in this case are −0.1 and +0.1 using the test:

$$\text{Is } D_{LL}<D<D_{UL}$$

where:

$D_{LL}$ is the lower directional limit; and $D_{UL}$ is the upper directional limit.

If the directional coefficient (D) is between these lower and upper limits ($D_{LL}$) and ($D_{UL}$), then the test is passed.

If all three tests are passed, then the method proceeds to step 260 and the controller 10 is operable to reduce the motor torque being supplied by the ISG 8 by reducing the current supplied to the ISG 8. The method then returns to the start from step 260 to recheck whether slip is occurring as indicated by the return line from step 260 to step 200.

If any of the three tests is failed, then this is taken to indicate that a positive determination of belt slip has not been obtained and, as indicated by the return line from step 250 to step 200, the method returns back to the start.

Figure 3A:
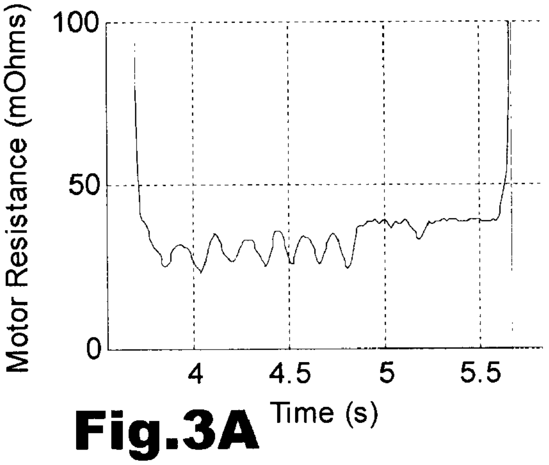
FIG. 3A is a graph of motor internal resistance against time for an engine start in which no belt slip occurs.
Figure 3B:
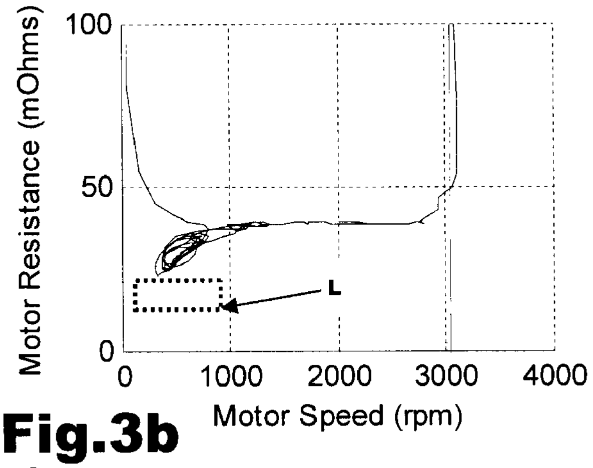
FIG. 3B is a graph of the same engine start shown in FIG. 3A comparing motor internal resistance with motor speed and showing in graphical form a box "L" indicative of predetermined resistance and speed thresholds.
Figure 4A:
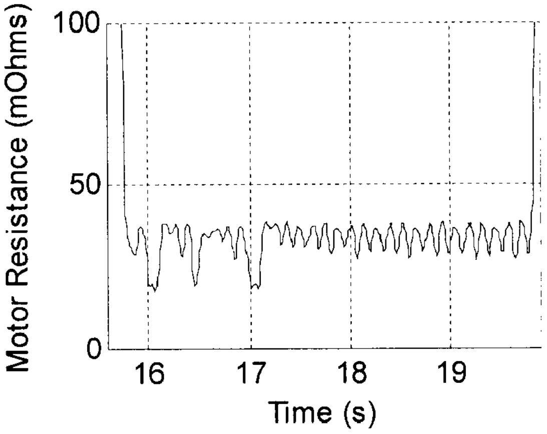
FIG. 4A is a graph of motor internal resistance against time for an engine start in which belt slip occurs.
Figure 4B:
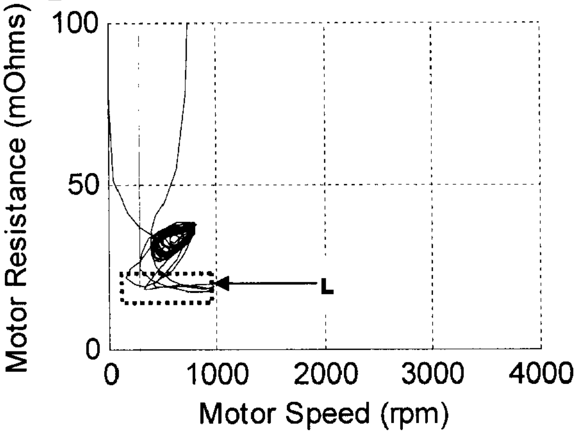
FIG. 4B is a graph of the same engine start shown in FIG. 4A comparing motor internal resistance with motor speed and showing in graphical form a box "L" indicative of the predetermined resistance and speed thresholds.

FIGS. 3B and 4B show the application of the resistance and speed limits which form a box "L" to the situation where the ISG 8 is operating as a motor to start the engine 5. In FIG. 3B it can be seen that the trace does not enter the box "L", indicating that no slip is occurring, whereas in FIG. 4B the trace enters the box "L" indicating that slip is occurring.

Although in this case three tests are used, the method could be simplified by using only the resistance and speed tests which would eliminate the need for the step 240 and require only one measurement of speed and resistance to be obtained. This has the advantage that the method can be processed more rapidly if the controller has limited processor capacity or if a very rapid updated of slip condition is required but increases the risk of slip being falsely determined to exist.

As before, the method can also be applied to the situation where the ISG 8 is operating as a generator. But in this case, the values used for the predetermined limits may need to be changed to allow for the different operating conditions.

Although the invention has been described with reference to an example using resistance, it will be appreciated that the inverse could also be used, namely, the conductance, that is to say, current divided by voltage.

Therefore, in summary, the invention provides a method in which three measured properties, namely, current, voltage and rotor or shaft speed that are already available to a controller are combined in order to detect the onset of belt slip without the need for external data.

It is an advantage of this invention that a high speed data bus, an external control module and a crankshaft speed sensor are no longer needed, leading to a substantial cost saving. In addition, the accuracy of speed measurement is better than can be achieved with a conventional crank sensor and so a more precise determination of when slip is occurring can be obtained and the speed can be accurately sensed down to a very low engine speed.

Although the method has been described with reference to an application in motor vehicles equipped with Micro Hybrid systems using a Belt Driven Integrated Starter Generator (BISG) to achieve Stop-Start operation of the combustion engine, it will be appreciated that the invention could be applied with equal advantage to detect belt slip where an electric motor is used as a take-off power assist to improve vehicle acceleration in a mild hybrid vehicle or where the electric motor is used to drive the motor vehicle itself, such as is the case for a pure electric vehicle or a hybrid vehicle or where the internal combustion engine is used to drive an electric generator for recharging one or more batteries, for generating electricity, or for energy recuperation during vehicle braking or vehicle coast down.

It will also be appreciated that the invention can also be used in any application of an electric machine where belt slip needs to be prevented. So, for example, it could be used to detect belt slip between any electric motor driving a transmission or machine or between an electric generator and a source of motive power and so is not limited to use in an automotive vehicle.

Although two specific methods for using the rotor speed, current, and voltage have been disclosed, it will be appreciated that these measurements could be combined in different ways, in a different order to those described without departing from the scope of the invention.

Furthermore, it will be appreciated that although the invention has been described with reference to the use of three measured parameters namely rotor speed, current, and voltage, belt slip could also be detected by measuring and combining only two of the parameters, e.g., rotor speed and current, rotor speed and voltage, or voltage and current.

It will be appreciated by those skilled in the art that although the invention has been described by way of example with reference to one or more embodiments, it is not limited to the disclosed embodiments, and modifications to the disclosed embodiments or alternative embodiments could be constructed without departing from the scope of the invention.

The invention claimed is:

1. A method for detecting slippage between an electric machine and a machine drivingly connected to the electric machine by a drive belt, the method comprising:

determining at least two operational parameters selected from a rotational speed of a rotor of the electric machine, a current supplied to or generated by the electric machine and a voltage supplied to or generated by the electric machine; and determining whether belt slip is occurring based only upon said at least two determined operational parameters.

2. The method as claimed in claim 1 wherein the electric machine is an electric motor.

3. The method as claimed in claim 2 wherein the method further comprises reducing at least one of the current and the voltage supplied to the motor in order to reduce the torque produced by the motor when belt slip is determined to be occurring.

4. A method for detecting slippage between an electric machine and a machine drivingly connected to the electric machine by a drive belt, comprising:

adjusting at least one of the current and the voltage supplied to the electric machine in order to reduce the torque produced by the electric machine based on at least two operational parameters selected from a rotational speed of a rotor of the electric machine, a current supplied to or generated by the electric machine and a voltage supplied to or generated by the electric machine.

5. The method as claimed in claim 3 further comprising determining first and second rotor speeds ($RPM_a$) and ($RPM_b$) separated by a short time delay, subtracting the first rotor speed ($RPM_a$) from the second rotor speed ($RPM_b$) to produce a speed difference value and combining the speed difference value with the determined values of voltage (V) and current (A) supplied to the motor to produce a belt slip value.

6. The method as claimed in claim 5 wherein the belt slip value (BSV) is calculated in accordance with the equation $BSV=((RPM_b-RPM_a)^2*A)/V$.

7. The method as claimed in claim 6 wherein belt slip is determined to be occurring when the belt slip value is greater than a predetermined threshold.

8. The method as claimed in claim 3 further comprising:

determining a first internal resistance of the motor ($R_a$);

determining whether the first internal resistance ($R_a$) is between predetermined resistance limits;

determining whether a first motor rotor speed ($RPM_a$) is between predetermined speed limits; and determining that slip is occurring only if the first internal resistance ($R_a$) is between its predetermined resistance limits and the first rotor speed ($RPM_a$) is between its predetermined speed limits.

9. The method as claimed in claim 1 wherein the electric machine is an electric generator.

10. The method as claimed in claim 9 further comprising:

reducing at least one of the current and the voltage generated by the generator in order to reduce the torque required to rotate the rotor of the generator when belt slip is occurring.

11. The method as claimed in claim 10 wherein the machine to which the electric machine is drivingly connected is an internal combustion engine.

12. A belt slip control system for controlling slip between an electric machine and a machine drivingly connected to the electric machine by a drive belt, comprising:

a controller adapted to determine at least two operational parameters selected from a rotational speed of a rotor of the electric machine, a current supplied to or generated by the electric machine and a voltage supplied to or generated by the electric machine said controller using only the determined operational parameters to determine whether belt slip is occurring.

13. The control system as claimed in claim 12 wherein the electric machine is an electric motor and the controller is further adapted to reduce the torque generated by the motor when belt slip is determined to be occurring.

14. The control system as claimed in claim 13 wherein the electric machine is an electric generator and the controller is further adapted to reduce the torque required to drive the rotor of the generator when belt slip is determined to be occurring.

15. The control system as claimed in claim 14 wherein the electric machine is a combined motor/generator and, when belt slip is determined to be occurring, the controller is operable to reduce the torque generated by the combined motor/generator when the combined motor/generator is operating as a motor and to reduce the torque required to drive the rotor of the motor/generator when the combined motor/generator is operating as a generator.

16. A control system as claimed in claim 12 wherein the controller determines a belt slip value using the determined rotational speed, voltage and current and compares the determined belt slip value with a predetermined threshold to determine whether belt slip is occurring.

17. The control system as claimed in claim 12 wherein the controller determines a first internal resistance of the electric machine from the voltage and current, determines whether the first internal resistance is within predetermined resistance limits, determines whether a first rotor speed is within predetermined speed limits and determines that belt slip is occurring only if the first internal resistance and the first rotational speed are both within their respective limits.

* * * * *